(12) United States Patent
Formigoni et al.

(10) Patent No.: US 7,048,112 B2
(45) Date of Patent: May 23, 2006

(54) FOOD GRADE CONVEYOR

(76) Inventors: Jonathan E. Formigoni, 438 Galla Creek La., Pottsville, AR (US) 72858-8917; William J. Nahlen, 1712 S. Dayton Ave., Russellville, AR (US) 72802

( * ) Notice: Subject to any disclaimer, the term of this patent is extended or adjusted under 35 U.S.C. 154(b) by 0 days.

(21) Appl. No.: 10/950,763

(22) Filed: Sep. 27, 2004

(65) Prior Publication Data

US 2005/0029078 A1 Feb. 10, 2005

(51) Int. Cl.
B65G 21/00 (2006.01)
(52) U.S. Cl. .................. 198/861.3; 198/837; 198/841
(58) Field of Classification Search ............ 198/861.1, 198/861.3, 837, 841
See application file for complete search history.

(56) References Cited

U.S. PATENT DOCUMENTS

| | | | |
|---|---|---|---|
| 2,591,929 A | 4/1952 | Granath | |
| D208,803 S | 10/1967 | Knowles | |
| 3,605,994 A * | 9/1971 | Parlette | 198/861.1 |
| 3,848,732 A * | 11/1974 | Catalano | 198/836.1 |
| 3,881,594 A * | 5/1975 | Jepsen | 198/583 |
| 4,164,283 A * | 8/1979 | Flajnik | 198/840 |
| 4,624,362 A * | 11/1986 | Temme et al. | 198/735.4 |
| 4,658,952 A * | 4/1987 | Grundken et al. | 197/735.1 |
| 4,787,501 A * | 11/1988 | Rassmann et al. | 198/735.2 |
| 4,789,056 A * | 12/1988 | Bourbeau | 198/823 |
| 4,842,128 A * | 6/1989 | Tomlinson | 198/735.4 |
| 4,899,869 A | 2/1990 | Johnson | 98/603 |
| 4,932,516 A * | 6/1990 | Andersson | 198/823 |
| 4,961,492 A * | 10/1990 | Wiseman et al. | 198/841 |
| 5,082,108 A * | 1/1992 | Douglas | 198/836.4 |
| 5,119,926 A | 6/1992 | Draebel et al. | |
| 5,131,531 A * | 7/1992 | Chambers | 198/860.2 |
| 5,178,263 A * | 1/1993 | Kempen | 198/836.1 |
| 5,186,314 A * | 2/1993 | Clopton | 198/860.2 |
| D340,564 S | 10/1993 | Ledingham | |
| 5,316,134 A * | 5/1994 | Donohue | 198/861.1 |
| 5,350,053 A * | 9/1994 | Archer | 198/525 |
| 5,454,466 A | 10/1995 | Galarowic | |
| D371,666 S | 7/1996 | Kubsik et al. | |
| 5,601,180 A * | 2/1997 | Steeber et al. | 198/502.1 |
| 5,657,854 A | 8/1997 | Chen et al. | |
| 5,697,491 A | 12/1997 | Alex | 198/846 |
| 5,749,454 A | 5/1998 | Layne | |
| 5,788,056 A * | 8/1998 | Clopton | 198/779 |
| D398,729 S | 9/1998 | Hovsto et al. | |
| 5,799,780 A * | 9/1998 | Steeb et al. | 198/823 |
| D402,781 S | 12/1998 | Helmetsie et al. | |

(Continued)

*Primary Examiner*—Khoi H. Tran
(74) *Attorney, Agent, or Firm*—Cook, Alex, McFarron, Manzo, Cummings & Mehler, Ltd.; Edward D. Manzo

(57) ABSTRACT

A yoke for a food grade conveyor is formed of UHMW plastic molded as a single unit having left and right upright portions connected by vertically separated upper and lower cross portions. Each cross portion has a stanchion to provide a support face or ledge for connecting to a conveyor runner. The upright portions also include first ledges for supporting runners and second ledges for supporting side rails. The side rails can be screwed into the upper portion of the yoke. Smooth transition regions and curved surfaces promote cleanliness and sanitation. The runners are screwed onto the yokes at the support surfaces, and appropriately shaped stainless steel frame members are screwed onto the yokes. Modified yokes allow the inclusion of lower guides with channels. A flush-top conveyor arrangement is also described.

22 Claims, 14 Drawing Sheets

U.S. PATENT DOCUMENTS

| | | |
|---|---|---|
| D411,363 S | 6/1999 | Black et al. |
| 5,921,370 A | 7/1999 | Plesh, Sr. |
| 6,412,623 B1 | 7/2002 | Axmann et al. ............. 198/791 |
| D479,638 S | 9/2003 | Didion |
| 6,651,808 B1 | 11/2003 | Nguyen et al. ........ 198/781.08 |
| 6,685,008 B1 | 2/2004 | Schiesser et al. ............ 198/782 |
| 6,722,493 B1 | 4/2004 | Matsuoka et al. ........... 198/788 |
| 6,772,874 B1 | 8/2004 | Yamashita et al. ...... 198/781.03 |
| 6,782,994 B1 | 8/2004 | Foster .................... 198/750.03 |
| 6,782,996 B1 | 8/2004 | Wolf ...................... 198/781.02 |

* cited by examiner

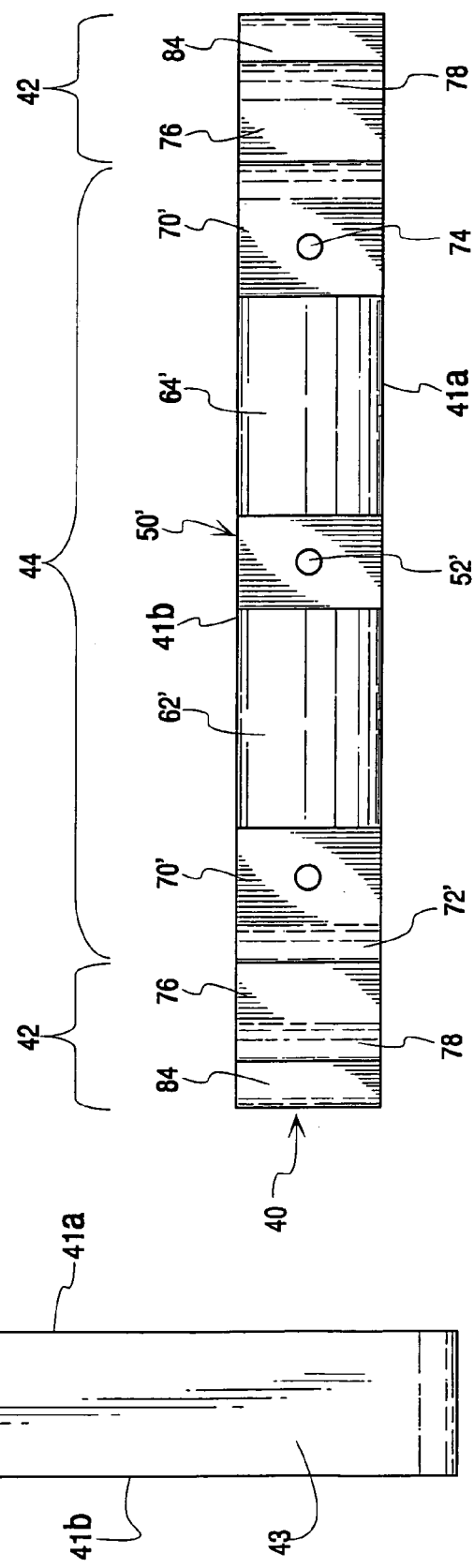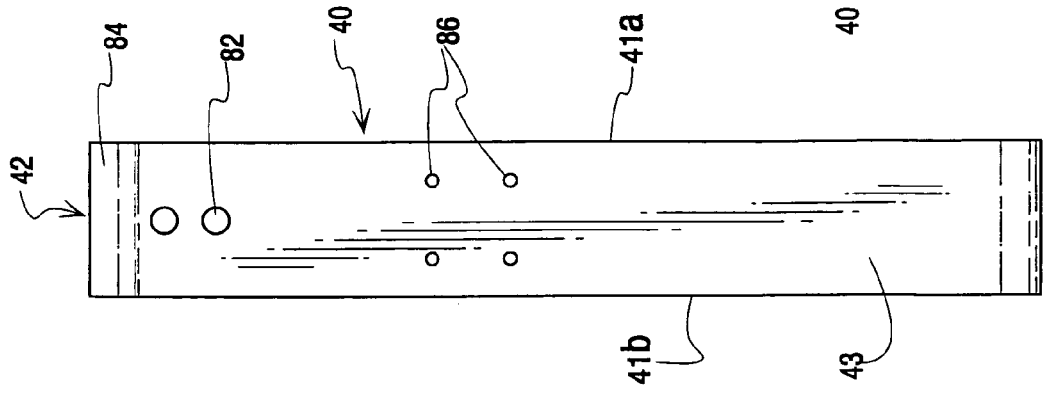

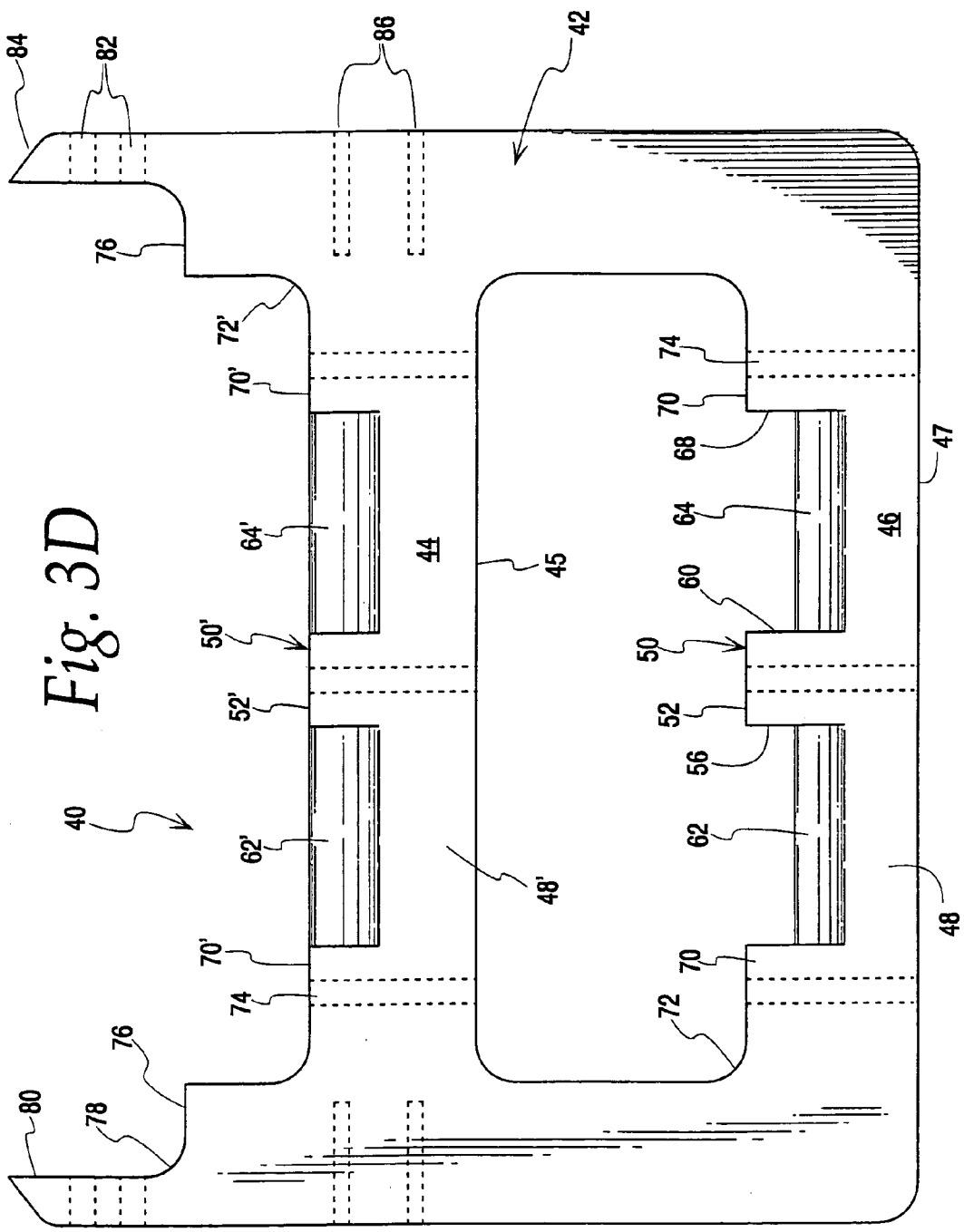

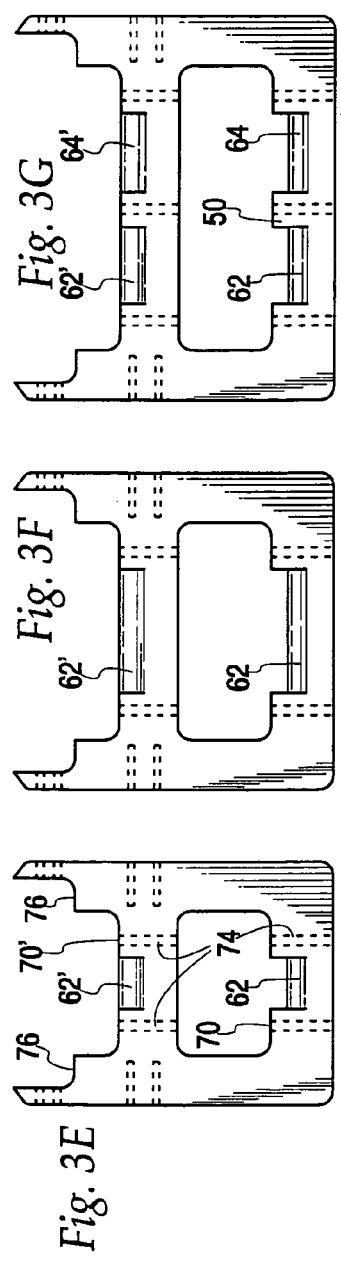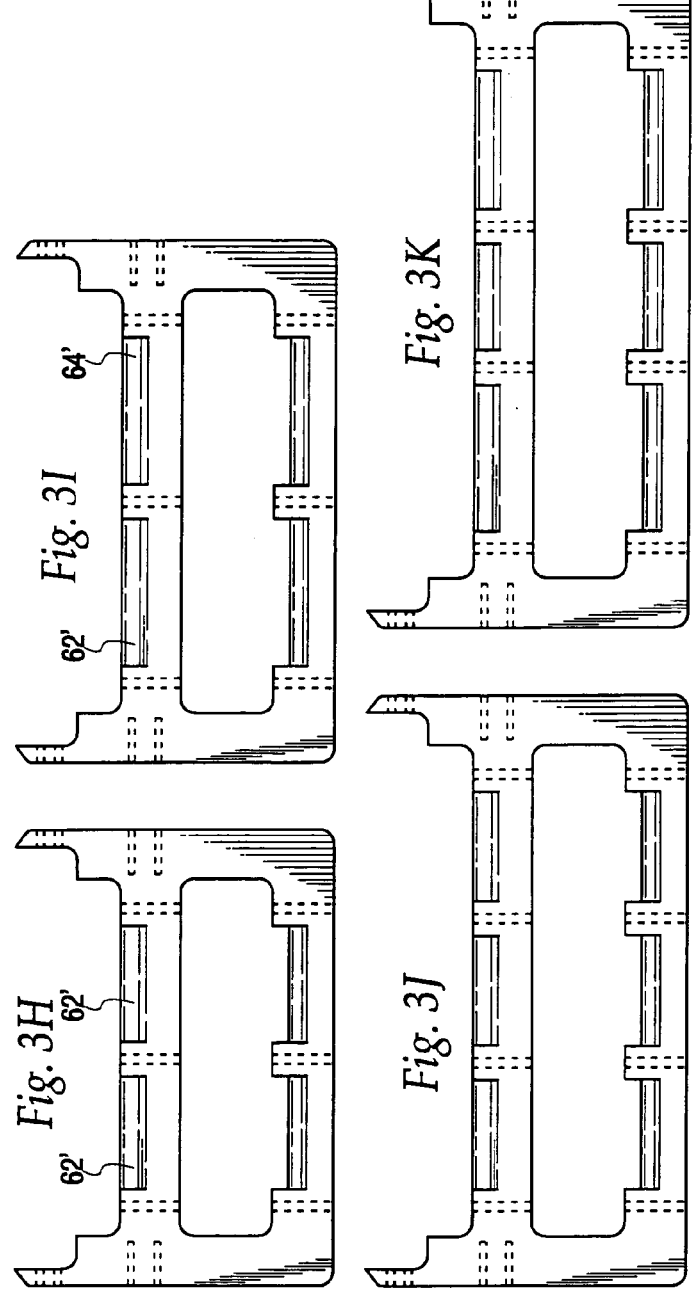

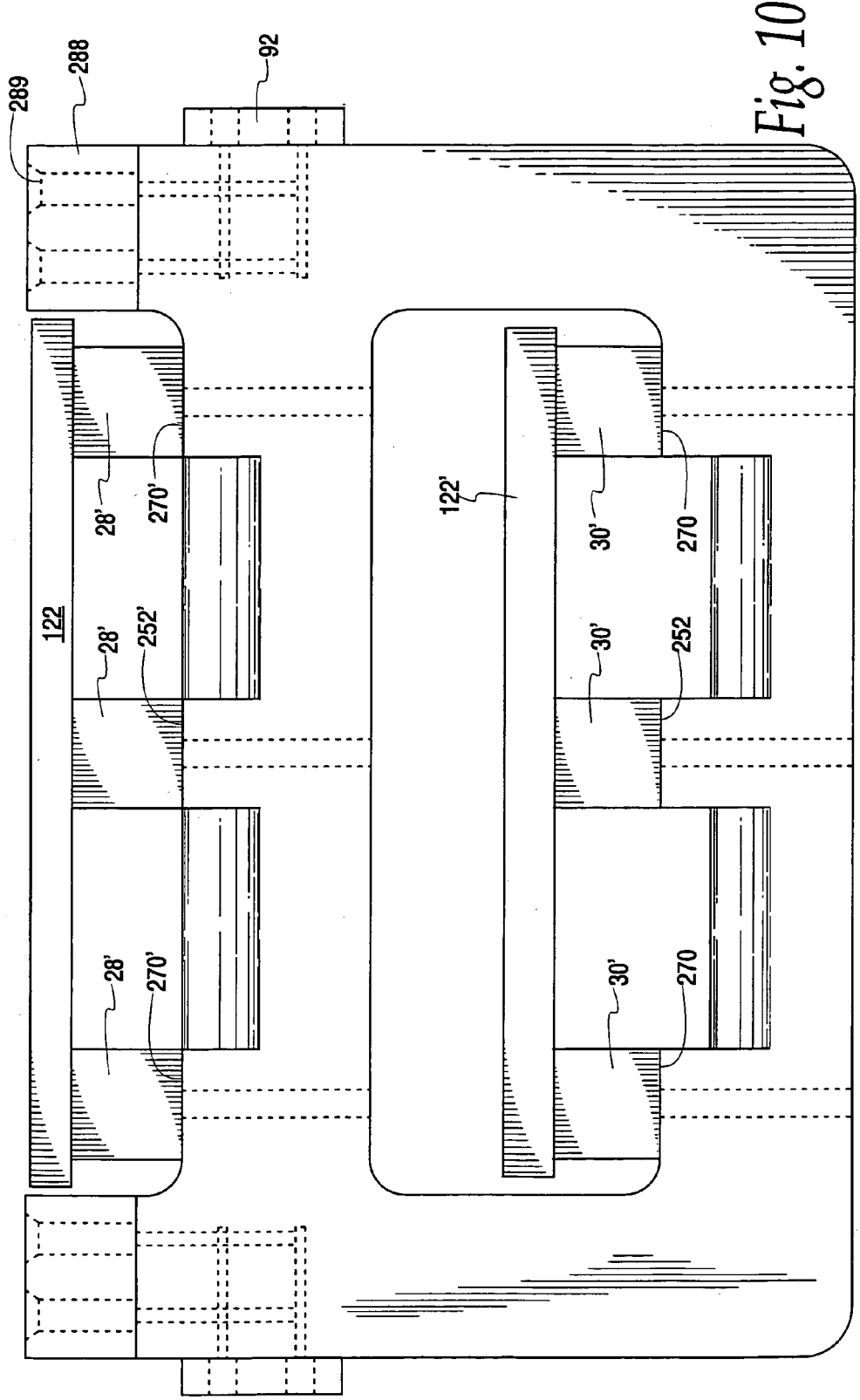

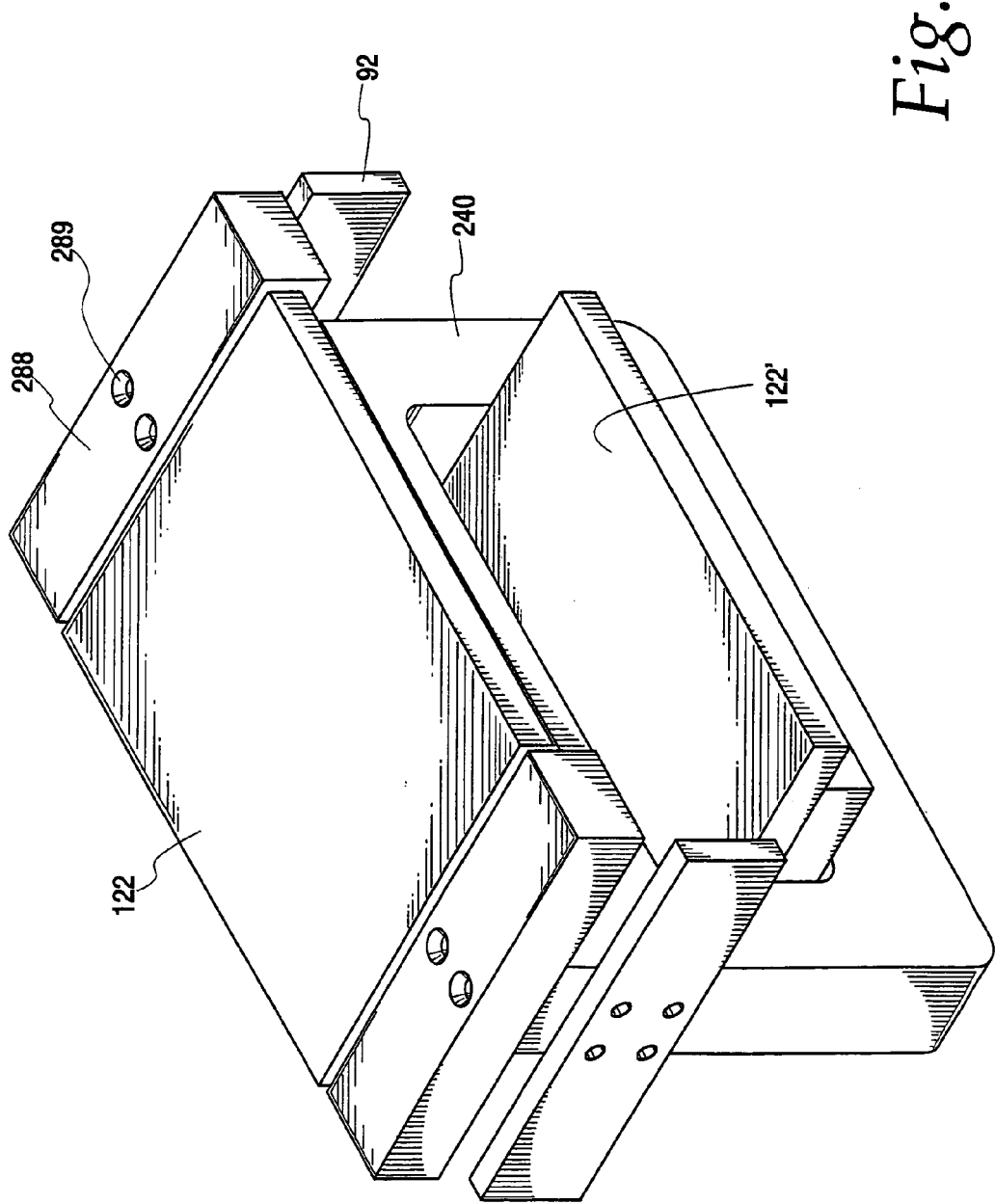

_US 7,048,112 B2_

FOOD GRADE CONVEYOR

FIELD OF THE INVENTION

The present invention concerns food grade conveyors.

Conveyors have been used for decades to transport items along a predetermined path for various purposes such as simple transportation, as part of an assembly line, for sorting or for other uses. Conveyor technology is well established for conveyors in general.

Conveyors have been used in the agricultural and food industry also. This brings certain special requirements to bear on the technology. For example, Johnson U.S. Pat. No. 4,899,869 is directed to a conveyor for food articles and comments that the requirements of the U.S. Food and Drug Administration call for metals that are used to be stainless steel or to have properties similar to stainless steel so that contamination of food articles by metal or rust is eliminated. Also, plastic materials that contact the food articles or come into close proximity to food articles must comprise materials approved by the Food and Drug Administration. Consequently, these requirements result in food processing conveyors being quite expensive compared with ordinary conveyors. Johnson notes the desirability of reducing the use of stainless steel structural members in conveyor.

Certain of the stainless steel components in food grade conveyors are required to be 100% welded. Bacteria traps must be avoided, and flat areas that allow products to accumulate must be minimized. All welds must be cleaned and inspected.

FIGS. 1 and 2 are directed to a typical food grade conveyor design in prevalent use throughout the United States today. Generally speaking, a conveyor 10 comprises a plurality of spaced-apart yokes 12 each having a pair of spaced-apart uprights 14 connected by a stainless steel cross member 16 which is typically 1.5"×1.5" box tubing. A frame member 18 extends longitudinally and connects together a plurality of yokes 12. Typically frame member 18 is located laterally outward from yoke members 12, as shown in FIG. 1. Further, frame member 18 is typically made of 1.5" stainless steel box tubing. Accordingly, it is welded at each point to the yoke member. A frame member 18 is located on both the left and right side of the conveyor 10. Conveyor 10 includes parallel, spaced-apart side rails 20. Typically, each side rail is a plank-like member made of UHMW plastic, and as shown in FIG. 1, each side rail is bolted or screwed to the inside face of a corresponding set of uprights 14. Spaced across the top surface of the cross member 16 are a group of spacers 22, each typically made of 1"×1¼" flat bar. Spacers 22 are welded to the top surface of cross member 16 at welds 24. As shown in FIG. 2, it is typical to provide a group of holes 26 through the spacers and through the uprights to allow the side rails to be attached to the uprights and to allow runners 28 to be attached to the yokes. Typically the runners 28 are made of UHMW plastic. FIG. 1 shows three runners 28 above the cross members 16 and two runners 30 located below cross members 16. As shown, lower runners 30 are secured to flanges 32 pointing inwardly at the bottom of uprights 14. That is to say, each of the uprights 14 comprises an L-shaped member with its flange located at the base, the flanges pointing toward one another with the uprights rising substantially vertically therefrom. Each flange 32 has a hole 26 in it to facilitate connection of the plastic lower runner 30 to the flange 32. A conveyor belt may be provided on top of the runners and driven by known means, making its return travel on the upper surface of lower runners 30.

Food grade conveyors are offered in about two dozen different widths. The belts may be as wide as ten feet. Such conveyors can feed and remove products such as chicken, fish, red meat, lobster tail, sausage, or other foods. The yokes are typically 18" apart, built from box tubing and flat bar, and are cut out and welded together. The fabrication of the yokes takes approximately 20% of the fabrication time of building the complete conveyor. The conveyor can be constructed with curves and inclines. As can be appreciated, the construction of food grade conveyors is labor intensive, requiring numerous welds which must pass muster under regulatory provisions. It is desirable to simplify the fabrication of food grade conveyors and lower the cost while at the same time preserving flexibility of design.

BRIEF DESCRIPTION OF THE DRAWINGS

In describing preferred embodiments of the present invention, reference is made to accompanying drawings wherein like reference numerals denote like parts and wherein:

FIGS. 3A, 3B, and 3C are perspective, top, and side views of a representative yoke according to principles of the present invention; FIG. 3D is an end view representation of the yoke of FIGS. 3A to 3C;

FIGS. 3E to 3K are end view representations of various yokes according to principles of the present invention;

FIGS. 10 and 11 are an end and perspective representations of a flush-top conveyor portion using the yoke of FIGS. 8–9.

DESCRIPTION OF PREFERRED EMBODIMENTS

Figure 1:
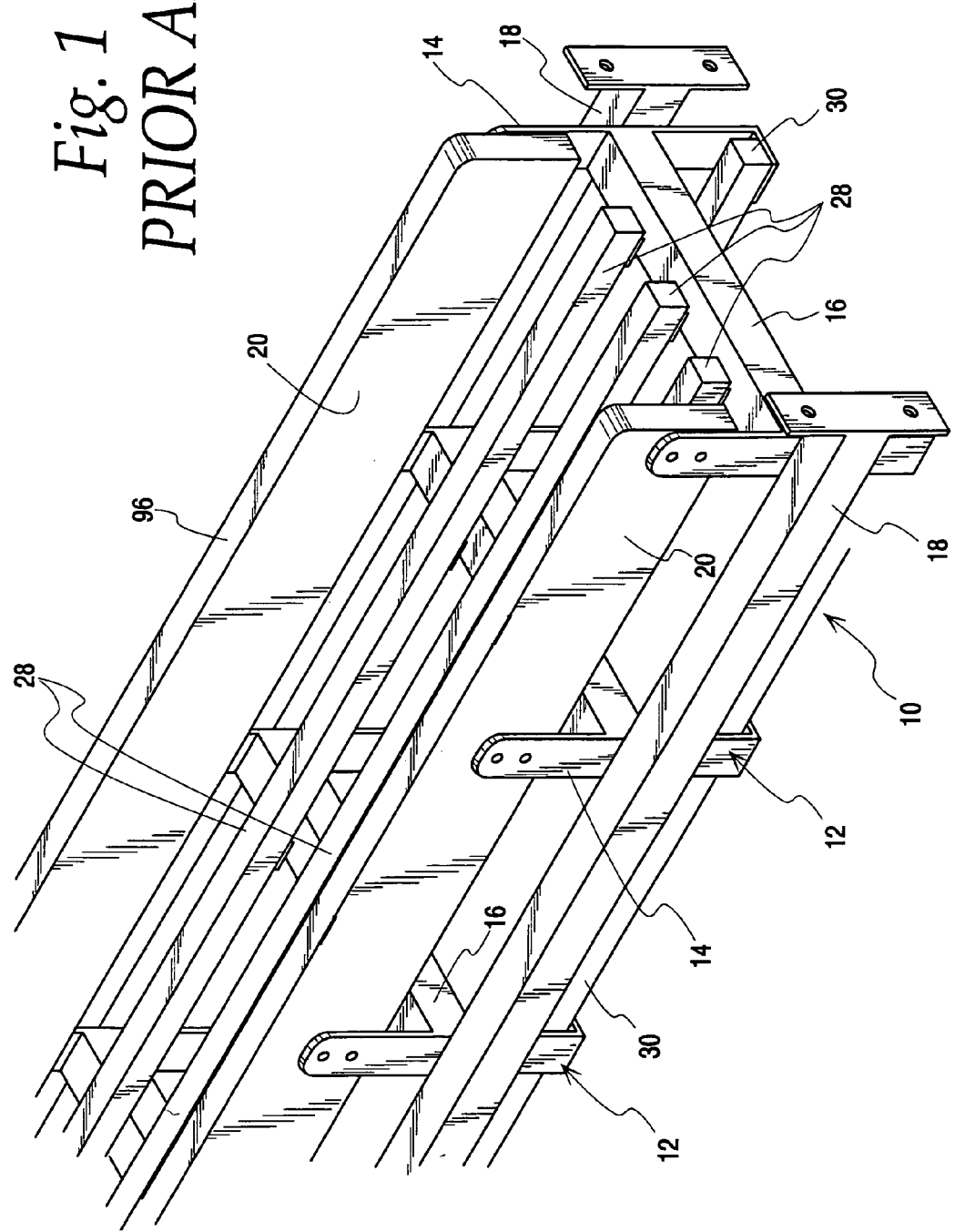
FIG. 1 represents a perspective view of a typical state-of-the-art conveyor used in the food industry.

The typical conveyor in use in the food grade industry has been described above with reference to FIGS. 1 and 2. Such conveyors involve or require numerous welds in the several yokes to assemble the box tubing and the flat bar from which the yokes are created. FIGS. 3A, 3B, 3C, and 3D show perspective, top, side, and end views of a representative yoke 40 embodying various aspects of the present invention. Yoke 40 preferably is a single, unitary body member preferably made of a polymer, preferably UHMW polyethylene (UHMWPE) or a comparable material. "UHMW" is well-known in the food conveyor industry for use as runners and side rails. Preferably, yoke 40 is injection molded and is wider than the width of the belt to be used.

In the illustrated embodiment (and referring especially to FIG. 3A unless otherwise indicated), yoke 40 includes opposite major faces 41a, 41b (see also FIG. 3C), upright portions 42, an upper cross portion 44 and a lower cross portion 46. As will be seen in FIG. 4, upper cross portion 44 supports a first set of belt runners 28' for the belt, and lower cross portion 46 supports a second set of belt runners 30'. The upper and lower cross portions 44, 46 preferably have the same configuration and are aligned one over the other vertically, but separated spatially. Preferably major faces 41a, 41b of yoke 40 are parallel to each other. They could, however, be curved or tapered (inclined) if desired.

Thus, lower cross portion 46 includes a base member 48 which may be generally flat on the bottom surface thereof and have opposed planar faces. Extending upward from base portion 48 is a stanchion 50 which is generally rectilinear in shape. That is, stanchion 50 includes a generally horizontal upper face 52 with four flat faces extending downward from the edges of horizontal face 52. Thus, stanchion 50 includes faces 54, 56, 58 and 60. Face 54 is illustratively coplanar with and part of the major face 41a of yoke 40. Likewise, face 58 is illustratively coplanar with and part of major face 41b of yoke 40. Faces 56 and 60 are illustratively generally parallel to each other and are generally perpendicular to faces 54 and 58. Of course, faces 54, 56, 58 and 60 could be ramped or curved, but preferably they make a smooth transition to the base portion 48 to promote ease of cleaning and sanitation. It will be understood that each yoke 40 may have multiple such stanchions 50 across a lower cross portion and multiple stanchions across upper cross portions.

Extending upward from base portion 48 is a rounded face 62, illustratively in the form of a half cylinder of rotation. A first such rounded face 62 is shown on one side of stanchion 50, and a second rounded face 64 is shown on the opposite side of stanchion 50. Thus, stanchion 50 is flanked by rounded faces 62, 64 with their rounded faces pointed upward. The rounded faces extend from the base portion 48. Accordingly, the rounded face 62 intersects face 56 of stanchion 50 in an arc 66. (Likewise, rounded face 64 intersects face 60 in a similar arc.) Proceeding to the right with respect to FIG. 3, rounded face 64 extends from flat face 60 transversely across the yoke 40 to another flat face 68 where it forms another arc 66 congruent to arc 66 on stanchion 50. Vertical face 68 extends upward to a flat, horizontal ledge 70 which preferably lies in the same plane as horizontal face 52 of stanchion 50. Ledge 70 also terminates at the major faces 41a, 41b of yoke 40. The fourth side of ledge 70 (the outermost side) preferably is a transition region 72 to the (right) upright portion 42. Preferably transition region 72 is curved to afford a smooth transition without crevices.

Preferably the left side of yoke 40 mirrors the structure just described. That is, the left upright portion 42 also includes a respective lower ledge 70 with a similar transition region 72. Preferably, the ledges 70 and horizontal face 52 lie are coplanar, although separated. Preferably ledge 70 extends inward toward stanchion 50 from its upright portion 42, and preferably ledge 70 extends from one major face 41a to the other major face 41b of yoke 40.

Having described the lower cross portion 46 with its stanchion 50 and the left and right ledges 70, the upper cross portion 44 generally corresponds in structure to the members just described for the lower cross portion 46. Thus, upper cross portion 44 comprises an upper stanchion 50' flanked by upper rounded faces 62' and 64' rising from a base portion 48'. Likewise, upper stanchion 50' has an upper horizontal face or ledge 52' which lies in the same plane, preferably, as upper ledges 70'. Just as each lower ledge 70 has a transition region 72 to an inside vertical face 73, the upper transition region 72' extends between upper ledge 70' and upper inside vertical face 73'. Illustratively but not necessarily, vertical face 73 lies in the same plane as vertical face 73'.

Figure 3A:
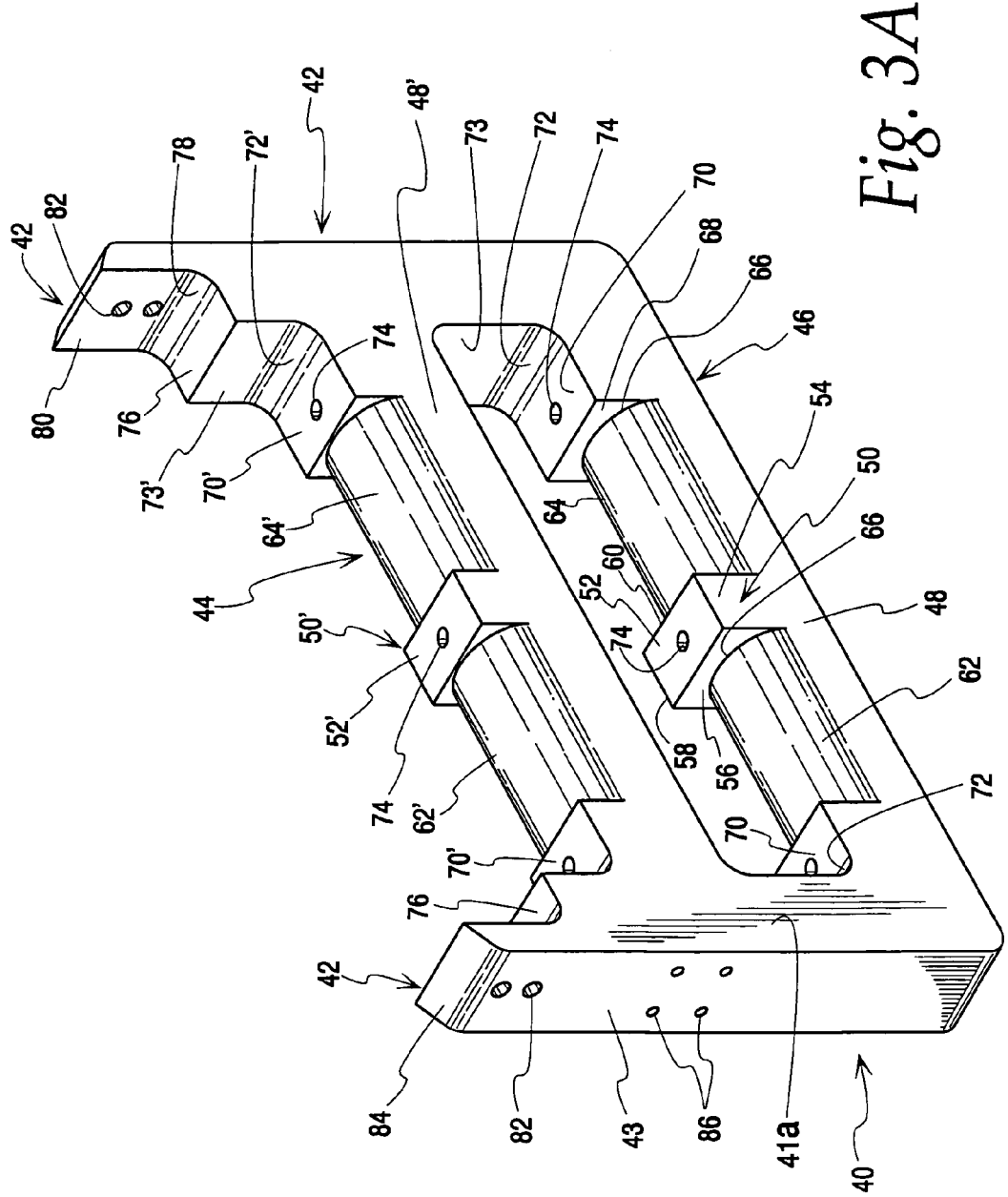

One difference, easily visible in FIGS. 3A and 3D, between the upper cross portion and the lower cross portion is that in the upper cross portion, the horizontal face or landing 52' of stanchion 50' preferably is no higher in elevation than the peaks of rounded faces 62' and 64'. In the lower cross portion, however, a drop of preferably 0.25 inches is provided from ledges 70 and horizontal face 52 down to the peaks of rounded faces 62 and 64. The drop is needed for washout when a cantanary is used directly behind the drive. This allows belt slack to accumulate.

Figure 2:
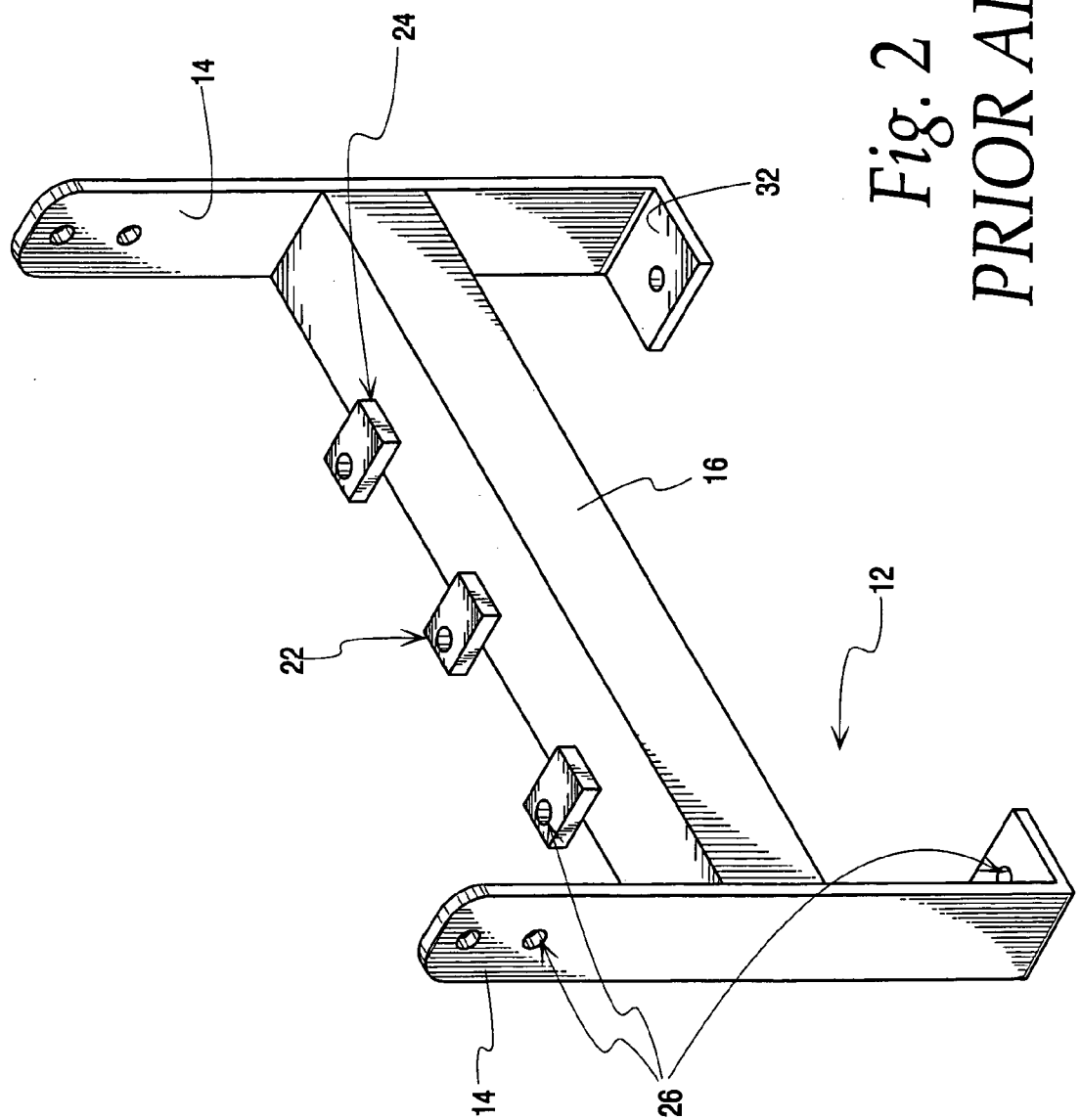
FIG. 2 is a perspective view of an existing yoke member of the conveyor of FIG. 1.

Each horizontal face 52 and 52' and each horizontal ledge 70, 70' is to connect to a respective runner such as runners 28 and 30 of FIG. 1. Accordingly, these horizontal ledges and faces each include a respective hole 74 generally centrally located and extending downward from the horizontal face or ledge.

Moving further upward in the right upright portion 42, a further horizontal ledge 76, curved transition portion 78 and vertical face 80 are included in the illustrative embodiment of yoke 40 as shown in FIG. 3. Faces 76 and transition regions 78 are for supporting side rails similar to side rails 20 of FIG. 1. Hence, horizontal ledge 76 may be elevated above the plane of upper ledge 70' and may further be displaced laterally outward therefrom. Preferably, horizontal ledge 76 is planar and lies in a plane parallel to a plane passing through ledges 70' and horizontal face 52'. The left upright 42 has these same features 76, 78, and 80. Horizontal mounting holes 82 extend through vertical faces 80 to the outside faces 43 of upright portions 42. A canted top face 84 connects outside face 43 to inside face 80. Finally, a set of horizontally disposed holes 86 extend from outside face 43 into the upright portion 42, preferably at approximately the location of the upper cross portion 44. Holes 86 are for connecting to a frame member, as explained infra.

FIG. 3B shows a top or plan view of yoke 40. From this view, the lower cross portion 46 is obscured, but the upper cross portion 44 is visible. The uprights 42 are seen from above, with the horizontal ledges 76 seen clearly, along with transition regions 72' and 78.

FIG. 3C shows a side view of a yoke 40. The mounting holes 82 and 84 are clearly seen. Also, from this view, one can see that the major faces 41a and 41b are parallel to each other in the preferred embodiment.

FIG. 3D is an end representation of yoke 40, but the normally hidden lines for holes 74, 82, and 86 are represented also (along with centerlines for the holes). From this view, one can see most clearly that surfaces 52' and 70' lie in one plane, and surfaces 52 and 70 lie in another plane. As discussed above, these surfaces or landings are for supporting belt runners.

Illustrative yoke 40 as represented in FIGS. 3A, B, C, and D is configured to support three upper runners and three lower runners. The number of runners, however, is a design choice that varies from one application to the next within the scope of the present invention. Preferably, yoke 40 will include at least one stanchion 50 for supporting a central runner, but if a central runner is not required, then stanchion 50 can be excluded. FIGS. 3E~3K are end view representations of yokes according to various aspects of the present invention in various widths. Some have no stanchions, others have one, and some have two. More can be used as needed. In these figures, the span between the opposed inside vertical faces 73' is indicated.

Accordingly, FIG. 3E represents a yoke according to various aspects of the present invention without any stanchion 50. The yoke of FIG. 3E may be used for a narrow belt, illustratively a 4-inch wide belt. FIG. 3E has a representation for holes 74 which extend vertically through the ledges 70 to allow the connection of belt runners thereto. As can be seen, the yoke of FIG. 3E has two upper ledges 70' and two lower ledges 70. These are for the belt runners. It also includes upper ledges 76 for side rails. With no stanchion, only a single rounded face 62 is included in the lower cross portion, and a single rounded face 62' in the upper cross portion.

FIG. 3F shows a wider yoke without any stanchion 50. Its construction is identical to that of FIG. 3E but it accommodates a wider belt, illustratively a 6-inch wide belt.

FIG. 3G shows a yoke for an 8-inch wide belt. This yoke includes one upper stanchion 50' and one lower stanchion 50. FIGS. 3H and 3I show similar yokes of the one-stanchion per cross portion arrangement, allowing 10-inch wide and 12-inch wide belts to be used, respectively.

When the belt is to be wider in size, more runners are generally used, and hence more runner support surfaces. FIGS. 3J and 3K show yokes according to the present invention having two stanchions per cross member, for belts that are up to 14 inches and 16 inches wide, respectively. This arrangement permits the use of four runners per cross portion—one runner per ledge 70 plus one runner per horizontal face 52. When more than four runners are desired, more stanchions 50 may be spaced along each cross portion 44 or 46 to support the runners.

Each of the yokes shown in FIGS. 3E–3K includes upper ledges 76 with curved transition regions 78 to support side rails, as will be discussed below with reference to FIG. 4. Each illustrated yoke includes two ledges 70 (and two ledges 70'). However, in a further modification, ledges 70 and 70' could be omitted in favor of stanchions 50 appropriately placed, although that is not a preferred configuration. Preferably, a runner will be placed beneath the outermost edges of the conveyor belt, and a stanchion, ledge, or other runner support surface will be included in the yoke.

It will be appreciated that prefabricated yokes 40 require no welding, facilitate the easy assembly of a conveyor system, and promote flexibility of conveyor design. Conveyors can be made from yokes 40 in configurations that are straight, curved, inclined, and declined. The inclined or declined conveyors may also have a flat feed and flat discharge region if desired.

Figure 4:
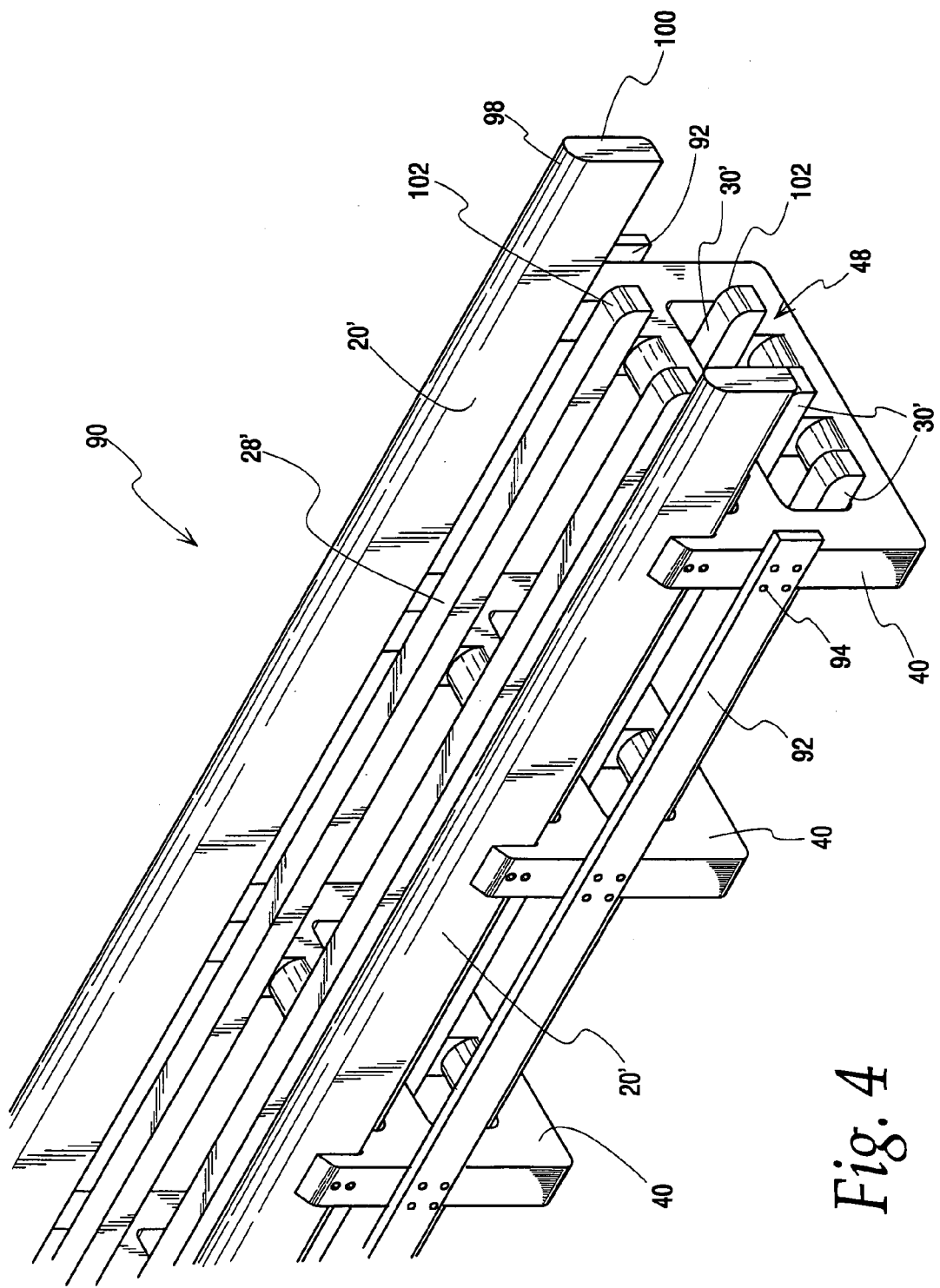
FIG. 4 is a perspective view of a conveyor (without belt) constructed with a plurality of the yokes shown in FIGS. 3A–3D.

Thus, FIG. 4 shows a portion of a conveyor 90 using a plurality of yokes 40 corresponding to FIGS. 3A–3D. As shown in FIG. 4, conveyor 90 includes three such yokes 40 held together by first and second frame members 92 made preferably of stainless steel. Illustratively, each frame member 92 can comprise 1.5"×0.375" stainless steel bar. Holes 94 in frame members 92 correspond in location to holes 86, allowing bolts or screws to be used to connect frame member 92 to each yoke 40. As shown, frame members 92 are located laterally on the outside of the upright portions 42 of yokes 40 and are longitudinally oriented with respect to conveyor 90.

Side rails 20' are connected to yoke 40 using bolts or threaded screws extending through holes 82 into the side rails 20'. Side rails 20' are preferably formed of the same UHMW plastic material as side rails 20. They may have a slightly different shape. Thus, while side rails 20 (FIG. 1) have a flat top surface 96, side rails 20' (FIG. 4) preferably have a rounded upper surface 98. This facilitates cleaning the side rail. The lower portion of side rails 20' may have a curve 100 to correspond to the shape of transition region 78 (FIG. 3). Preferably, the bottoms of rails 20' are otherwise flat, corresponding to the flat ledge 76.

A plurality of upper runners 28' are shown in FIG. 4 secured to yokes 40 by respective screws or bolts extending through holes 74. Likewise, a plurality of lower runners 30' are secured to yokes 40 using appropriate bolts or screws, connecting to the holes 74 in the lower stanchion and lower ledges 70. Runners 28' and 30' may terminate with rounded faces 102. Like side rails 20', runners 28' and 30' are preferably a UHMW polymer. Preferably threaded sheet metal screws are used for connecting the UMHW parts together.

The further construction of the conveyor 90 corresponds to features well known in the art and will include a conveyor belt or other structure riding upon the runners, and a drive system (not shown). Ordinarily but not necessarily, the bottoms of yokes 40 will rest upon a floor or elevated platform, and ordinarily yokes 40 will be oriented vertically. However, this can be modified for a conveyor system having inclines, declines, and curves.

Figure 5:
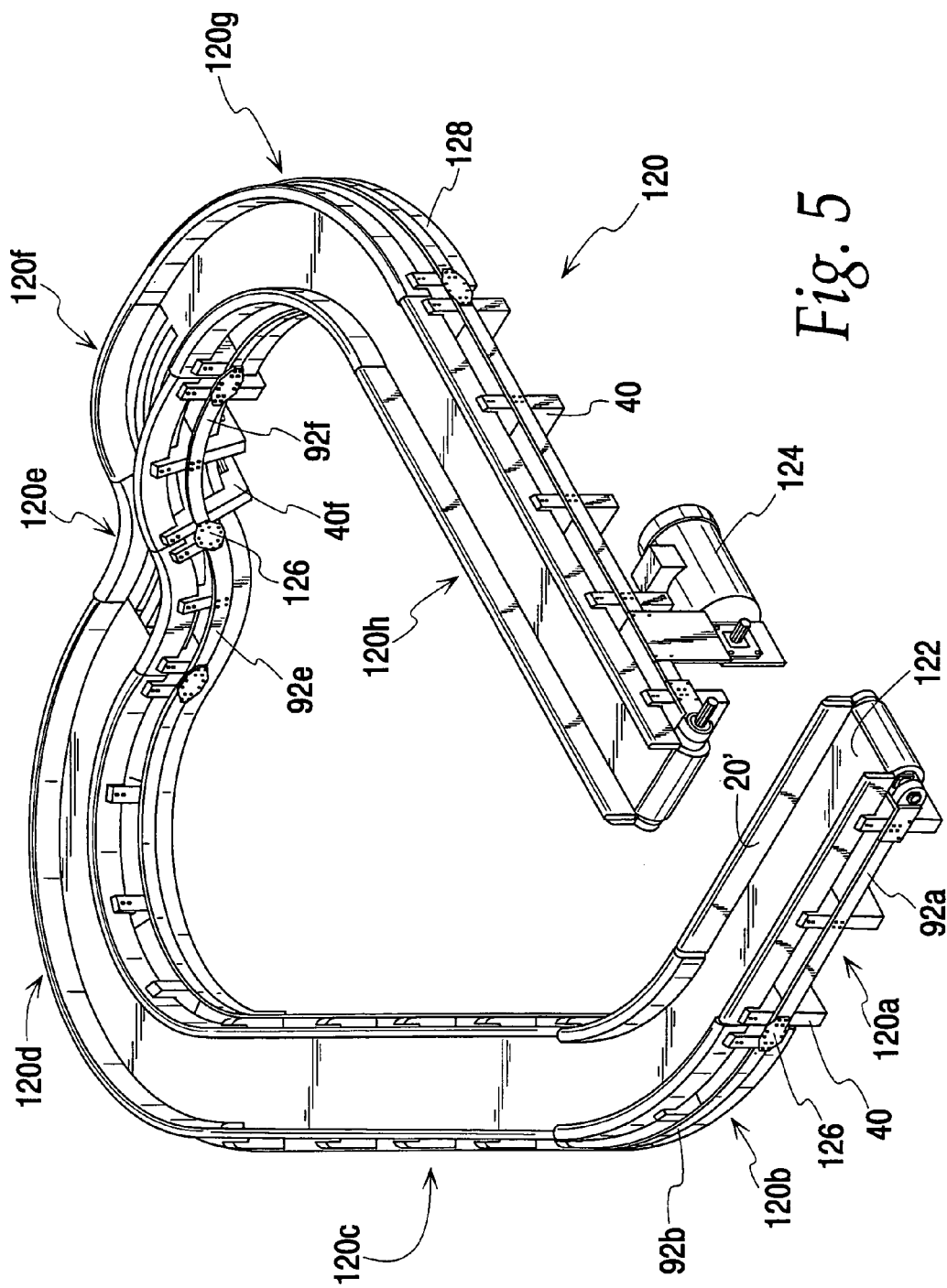
FIG. 5 illustrates a conveyor using the structures of FIGS. 3A–3D and 4.

FIG. 5 shows a conveyor 120 constructed using multiple yokes 40. FIG. 5 includes some parts broken away to promote clarity. It will be seen that conveyor 120 is illustratively in a full loop configuration and has inclination and declination. Thus, a first portion 120a may comprise a flat feed area. Progressing clockwise, the conveyor then includes a right curve region 120b followed by a straight flat region 120c. Next, conveyor curves to the right again at region 120d, and at region 120e the conveyor increases in elevation, leveling off at region 120f. At region 120g, the conveyor again curves to the right and transitions into a downward sloped final region 120h.

Generally, much of the top structure of yokes 40 as seen in FIGS. 3A and 4 are obscured by a conveyor belt 122. A suitable drive mechanism 124 is included. Drive mechanisms 124 are common in the industry and require no detailed description. The preferably steel frame members 92 correspond to the shape and turns of conveyor 120. Thus, a straight frame member 92a is used in region 120a and is screwed or bolted to three yokes 40. A connecting plate 126 joins frame member 92a to a curved frame member 92b at region 120b. The side rails 20' correspond to the shape of conveyor 120h, and successive segments of side rail 20' are connected in the conventional manner. It will be understood that the frame members 92 are curved as needed to form the desired conveyor shape. Thus, frame member 92e is shown with a concave upward curve, and frame member 92f, joined to member 92e by a connecting plate 126, has a concave down structure. The curves may be compound if desired. Where the conveyor is inclined, yokes 40 need not be vertical. For example, FIG. 5 shows that yokes 40f are not plumb. A trestle or other structure can be used to support elevated portions of conveyor 128.

Figure 6:
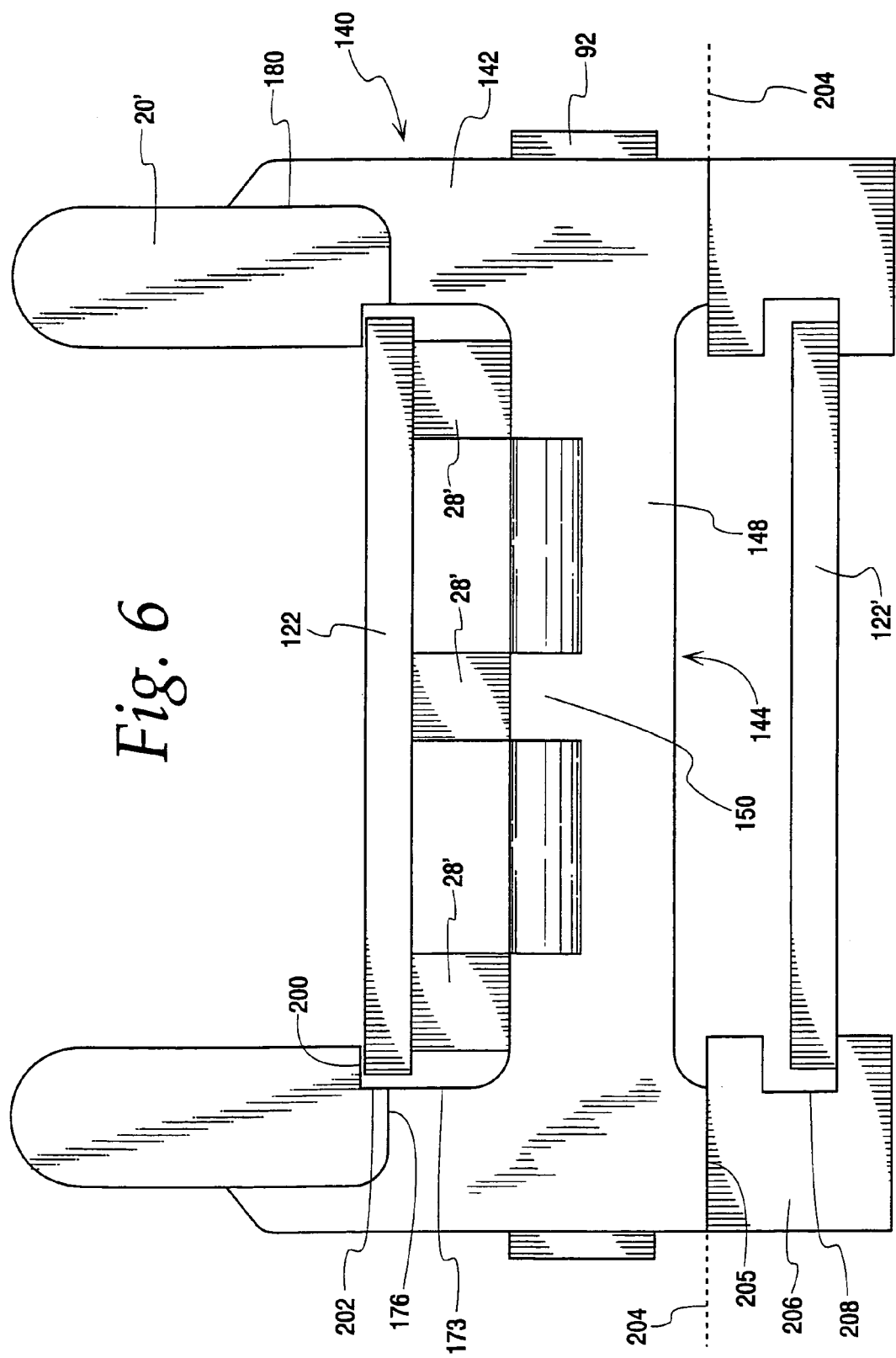
FIGS. 6 and 7 are end and perspective representations, respectively, of a modified yoke according to aspects of the present invention, for use especially in inclines and curves.
Figure 7:
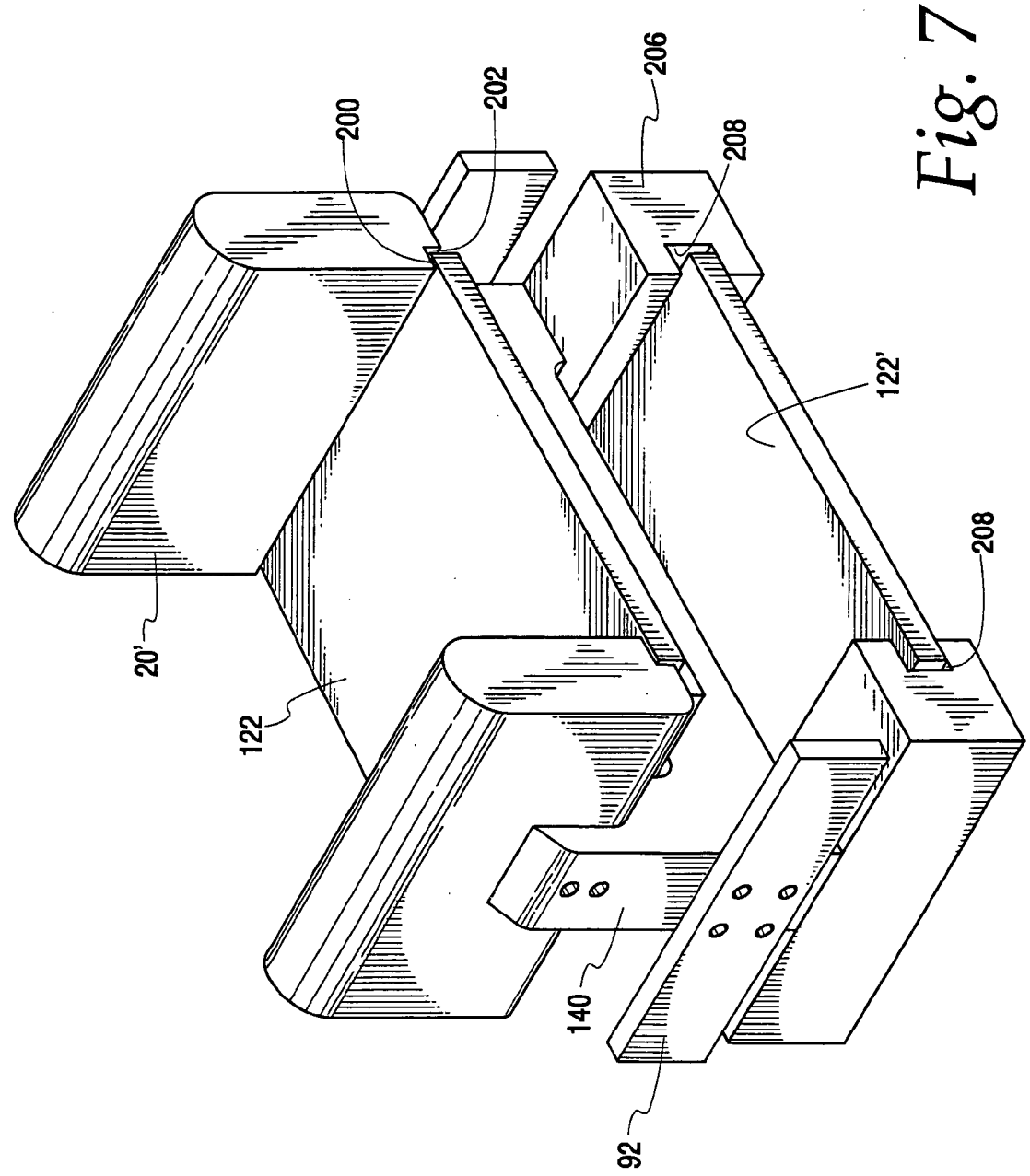

FIGS. 6 and 7 show a modified yoke 140. In curves and inclines, standard practice today (for conveyors with stainless steel yokes) is to cut off the bottom of the yoke to accommodate guides for the belt in such curves and inclines. The same practice may be followed with yokes according to the present invention. As shown in FIGS. 6–7, modified yoke 140 includes no lower cross portion but does include: (a) upright portions 142 similar to upright portions 42 of yoke 40, (b) an upper cross portion 144 identical to upper cross portion 44 of yoke 40, (c) an upper base portion 148 identical to base portion 48 of yoke 40, (d) a stanchion 150 identical to stanchion 50 of yoke 40, (e) an inside face 173 identical to inside face 73' of yoke 40, (f) upper ledges 176 identical to ledges 76, and (g) vertical faces 180 identical to vertical faces 80. Side rails 20' fit into the top part of upright portions 142 as before, resting on ledges 176, and secured to vertical faces 180 by the same screws extending through the same holes in the upper portion of the upright.

However, for inclines and curves, special channels are provided to guide the belt 122. For the upper course of belt 122, a cutout is made in the inside bottom corner of each side rail 20'. This cutout provides a horizontal surface 200 which will be just above the top of the conveyor belt and a vertical surface 202 which preferably is collinear with inside vertical face 173. The outside edge of the belt will preferably be located just inward from vertical surface 202 and/or inside vertical face 173. In this way, the lateral edges of the upper course of conveyor belt 122 are adjacent to surfaces 200, 202, and 173, and the belt is guided or restrained by these surfaces.

It is current practice today for stainless steel yokes to cut off the bottom portion and provide guides. The same practice may be followed with yokes 40 and 140. That is, yoke 40 can be cut with an appropriate saw (e.g., a band saw) along a horizontal plane 204 resulting in a bottom surface 205 of yoke 140 or yoke 140 can be fabricated with a bottom surface 205 at plane 204. Guide members 206 are then secured to bottom surface 205. Each guide member 206 has an inward facing, generally U-shaped guide channel 208. The lower course of belt 122 is designated by reference numeral 122' in FIGS. 6–7, and guide channels 208 contain the outer margin of the lower course of belt 122'.

Consequently, in the conveyor shown in FIG. 5, yokes 40 may be used for level portions and declines, but preferably yokes 140 are used in curves and inclines.

Some applications may call for a flush-top belt, that is, a conveyor where the upper belt is at the top of the conveyor. In the conveyors and portions thereof described thus far, the upper course of the belt is located below or at the bottom of side rails 20'. Yokes according to aspects of the present invention can be used to provide flush-top conveyors, i.e., conveyors without side rails along the upper course of the belt.

Figure 8:
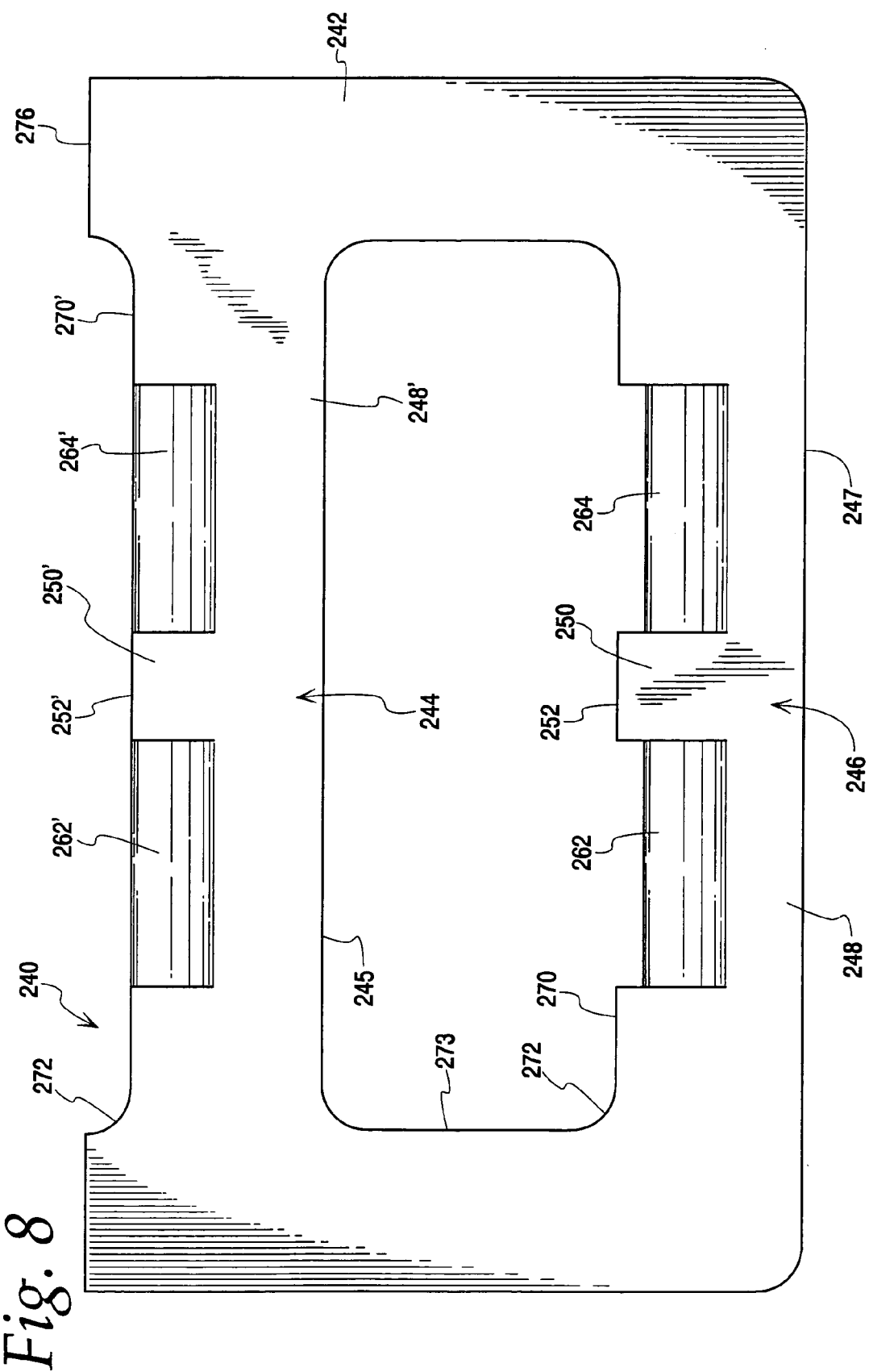
FIGS. 8 and 9 illustrate another embodiment of a yoke according to aspects of the present invention in a flush-top conveyor.
Figure 9:
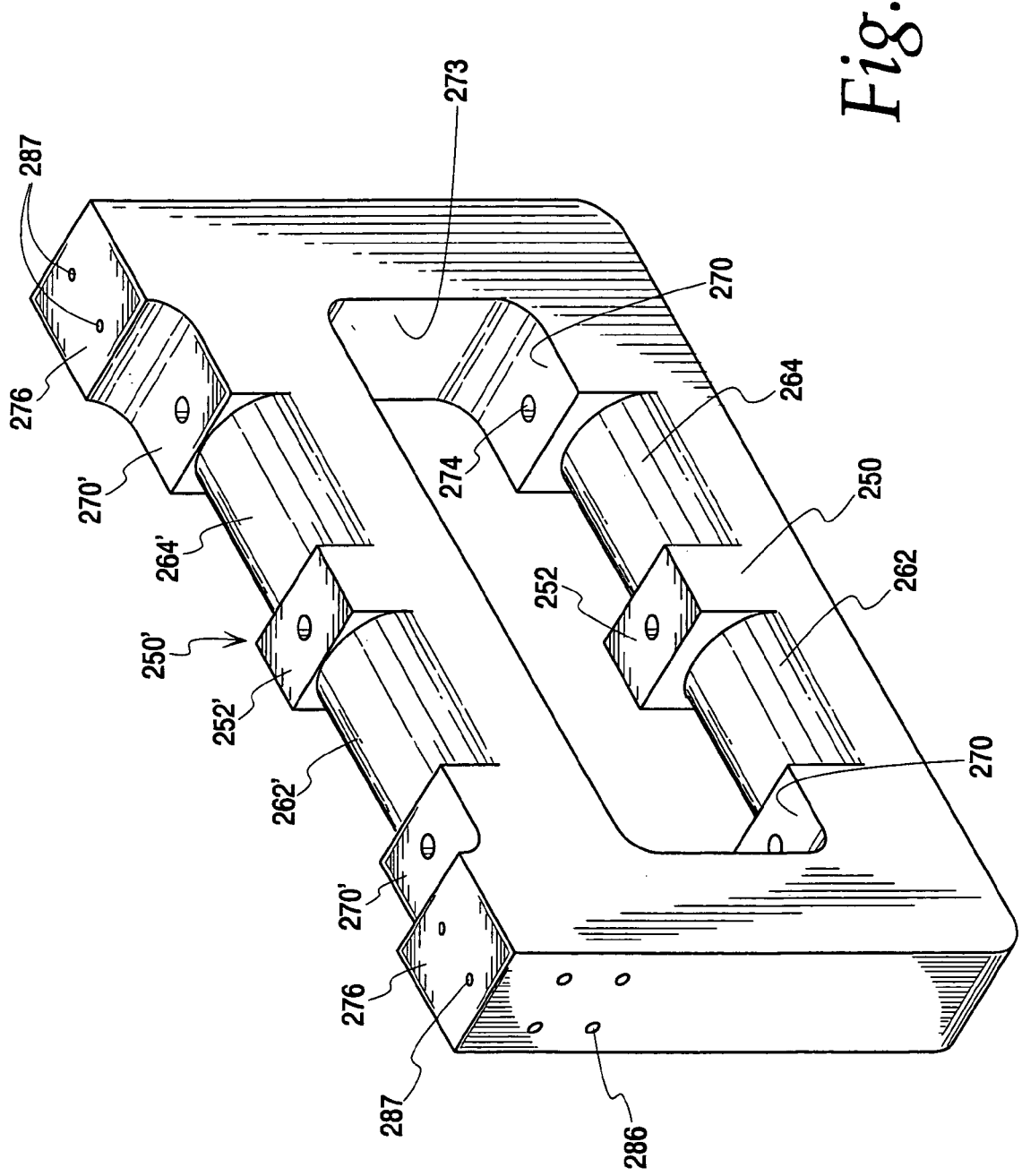

Thus, FIGS. 8 to 11 represent another embodiment of the present invention. FIG. 8 is an end view of a yoke 240 for a flush-top belt. FIG. 9 is a perspective view of yoke 240. FIG. 10 is an end view like FIG. 8 but including the runners and the belt, and FIG. 11 is a perspective view of the structure of FIG. 10.

Yoke 240 is similar in many respects to yoke 40, but it omits the tops of the upright portions 42, generally extending upper ledge 76 to the outside of the upright portion 42. Thus, yoke 240 as seen in FIG. 8 includes a pair of upright portions 242 joined by an upper cross portion 244 with a bottom surface 245 thereof. Upright portions 242 are joined also by a lower cross portion 246 with a bottom surface 247 thereof. A base portion 248 of lower cross portion 246 supports a centrally positioned stanchion 250 with a horizontal face 252. Upward facing rounded faces 262, 264 corresponding to half cylinders of rotation flank stanchion 50. The upper cross portion 244, like upper portion 44 of yoke 40, has an upper, centrally positioned stanchion 252' with an upper horizontal face 252' thereof, upper rounded faces 262', 264', upper ledges 270', and curved transition regions 272'. These correspond in size, shape, and function to their counterparts in yoke 40.

Unlike upright portions 42 of yoke 40, the tops of upright portions 242 of yoke 240 are defined by upper ledges 276.

Preferably, upper ledges 276 lie in a plane that is higher than that of 270'. Also, the ledges 270' are coplanar with upper face 252' of stanchion 250'. Similarly, the lower ledges 270 are coplanar with face 252.

FIG. 9 is a perspective view of yoke 240 similar to FIG. 3A. The same faces of the stanchions 250, 250' can be seen, as can the relationship of the rounded faces 262, 264, 262', 264' thereto. FIG. 9 shows holes 274 which are the same as holes 70. Holes 274 are vertical and extend into or through the stanchions 250, 250' and the ledges 270, 270'.

Further holes 287 extend downward through upper ledges 276. These are for connecting to low-rise side rails 288, as shown in FIGS. 10–11. Rails 288 include vertical through-holes 289, preferably countersunk as shown, aligned with holes 287 to allow the low-rise side rails to be connected by screws to yoke 240 via holes 287. FIG. 10 also shows upper runners 28' in their respective places upon ledges 270' and 252' and lower runners 30' in place upon ledges 270 and 252. These are secured by screws, just as with yoke 40.

FIG. 10 shows that the upper course 122 of the conveyor belt rides upon runners 28' and has its top surface approximately coplanar with the top surface of low-rise side rails 288. The lower course 122' of the belt rides on runners 30' the upper surfaces of which are coplanar with one another.

FIG. 11 is a perspective view of the flush-top conveyor arrangement using yoke 240.

It will be understood that the yokes 40, 140, and 240 described herein as illustrative embodiments are formed of UHMW polymer but can be any other suitable moldable material approved for food conveyor use. Each yoke has a body and at least one runner support surface. Each yoke has a body with left and right upright portions and at least one cross portion. Yoke 140 has just one cross portion, while yokes 40 and 240 have both upper and lower cross portions. The upright portions need not be perfectly vertical (plumb), and "upright" as used herein should not be understood to require perfectly plumb orientatin. Rather, the upright portions are generally predominantly vertical, but they may have curved or inclined sides, if desired, or they may have perfectly vertical sides. They elevate the upper cross member and provide connection surfaces for the side rails, in the illustrated embodiments.

Each yoke provides runner support surfaces, illustratively by means of ledges and flat upper faces on stanchions. No particular shape or structure is required for the ledges or stanchions. The term "stanchion" as used here is simply a post-like support structure. The support surface for the runner need not be elevated above the cross portion of the yoke but it is desirable to do so from the perspective of cleaning the conveyor. The support surfaces of these yokes 40, 140, 240 need not be rectilinear but could be oval, round, oblong, trapezoidal, or any other geometric shape that is convenient, so long as they provide places to connect runners to the yoke.

The unitary yokes constructed according to the principles set forth herein provide easy assembly, cut down assembly time, reduce the number of welds dramatically, are easy to keep clean, and facilitate flexibility of design of a food grade conveyor that meets the requirements of the Food and Drug Administration. The foregoing description is meant to be illustrative only, and persons of ordinary skill in the art will appreciate that various modifications can be made to the present invention. Yokes 40, 140, and 240 may have different configurations, as noted above, and can be made of UHMW plastic or other suitable material. They can be formed by any convenient molding or forming process, and can be made in a variety of widths.

We claim:

1. A yoke for a food grade conveyor, comprising:
   first and second spaced apart upright portions;
   at least one cross portion extending between and integral with said upright portions, a substantial portion of an upper face of said at least one cross portion having a curved, convex surface;
   at least one runner support surface;
   at least one side rail support surface;
   said yoke being an integral unit made of a UHMW polymer;
   mounting holes in at least one of said upright portions for connecting at least one side rail thereto, and
   at least one mounting hole in said yoke for connecting at least one runner thereto.

2. The yoke of claim 1 further including a stanchion located on said cross portion and flanked on opposite sides by said curved convex surface, a top of said stanchion providing a said runner support surface.

3. The yoke of claim 2 wherein said yoke has upper and lower cross portions, each including at least one respective stanchion flanked on opposite sides by respective ones of said curved convex surfaces, the top of each stanchion providing a respective runner support surface.

4. A yoke for a food grade conveyor, comprising:
   first and second spaced apart upright portions;
   at least one cross portion extending between and integral with said upright portions, a substantial portion of an upper face of said at least one cross portion having a curved, convex surface;
   at least one runner support surface;
   at least one side rail support surface;
   said yoke being an integral unit;
   wherein said at least one cross portion comprises an upper cross portion and a lower cross portion, each integral with said upright portions,
   wherein a substantial portion of an upper face of said upper cross portion has a curved, convex surface;
   wherein a substantial portion of an upper face of said lower cross portion has a curved, convex surface;
   wherein said at least one runner support surface comprises at least one upper runner support adjacent to said upper curved convex surface and at least one lower runner support surface adjacent to said lower curved convex surface.

5. A yoke for a conveyor, comprising:
   first and second spaced apart upright portions;
   upper and lower cross portions extending between and integral with said upright portions;
   each of said upper and lower cross portions including at least one respective stanchion located on said cross portion, each stanchion providing a respective runner support surface;
   at least one side rail support surface;
   said yoke being an integral unit;
   wherein said stanchions are integral with said yoke.

6. The yoke of claim 5 wherein said side rail support surface comprises a ledge in one of said uprights.

7. A yoke for a food grade conveyor, said yoke comprising:
   first and second spaced apart upright portions;
   an upper cross portion extending between and integral with said upright portions;
   wherein a substantial portion of an upper face of said upper cross portion has a curved, convex surface;
   a lower cross portion extending between and integral with said upright portions;
   wherein a substantial portion of an upper face of said lower cross portion has a curved, convex surface;
   each of said upper and lower cross portions having at least one runner support surface; and
   at least one side rail support surface;
   said yoke being an integral unit made of moldable material.

8. The yoke of claim 7 wherein said yoke is made of UHMW plastic.

9. The yoke of claim 7 wherein each cross portion includes a respective, upward-directed stanchion located on said cross portion, each said stanchion providing a horizontal ledge for said runner support surface and each said stanchion being flanked on opposite sides by a said curved, convex surface of said cross portion.

10. The yoke of claim 7 wherein each cross portion includes a respective horizontal ledge for said runner support surface.

11. The yoke for a conveyor of claim 5, wherein at least one of said cross portions includes an upper face, a substantial portion of which has a curved, convex surface.

12. A yoke for a food grade conveyor, said yoke comprising:
   first and second spaced apart upright portions;
   an upper cross portion extending between and integral with said upright portions;
   a lower cross portion extending between and integral with said upright portions;
   each of said upper and lower cross portions having at least one runner support surface;
   at least one side rail support surface;
   said yoke being an integral unit made of moldable material;
   wherein each cross portion includes a respective, upward-directed stanchion located on said cross portion, said stanchion providing a horizontal ledge for said runner support surface;
   at least one mounting hole in at least one of said upright portions for connecting at least one side rail thereto, and
   at least one mounting hole in each of said upper cross portion and said lower cross portion of said yoke for connecting at least one respective runner to each of said upper and lower cross portions.

13. The yoke for a food grade conveyor of claim 12, wherein at least one of said cross portions includes an upper face, a substantial portion of which has a curved, convex surface.

14. A yoke for a food grade conveyor, said yoke comprising:
   first and second spaced apart upright portions;
   an upper cross portion extending between and integral with said upright portions;
   a lower cross portion extending between and integral with said upright portions;
   each of said upper and lower cross portions having at least one runner support surface;
   at least one side rail support surface;
   said yoke being an integral unit made of moldable material;
   wherein each cross portion includes a respective, upward-directed stanchion located on said cross portion, said stanchion providing a horizontal ledge for said runner support surface;
   a first horizontal ledge associated with said upper cross portion, said first horizontal ledge lying in the same plane as said horizontal ledge of said stanchion associated with said upper cross member, and a second horizontal ledge associated with said lower cross portion, said second horizontal ledge lying in the same plane as said horizontal ledge of said stanchion associated with said lower cross member, whereby said upper cross portion provides at least three coplanar upper runner supports and said lower cross portion provides at least three coplanar lower runner supports.

15. The yoke of claim 14 wherein each said stanchion comprises a plurality of stanchions providing a plurality of coplanar runner supports.

16. The yoke of claim 14 wherein said side rail support surface comprises a ledge laterally displaced outwardly from one of said first horizontal ledges.

17. The yoke of claim 14 wherein each said cross portion includes a rounded upwardly-directed surface adjacent said stanchion.

18. The yoke of claim 14 further including respective smoothly-curved transition regions connecting each said first horizontal ledge and each said second horizontal ledge to a respective inside substantially vertical face of said upright portion.

19. The yoke of claim 14 further comprising holes for connecting frame members to said uprights.

20. The yoke for a food grade conveyor of claim 14, wherein at least one of said cross portions includes an upper face, a substantial portion of which has a curved, convex surface.

21. A food grade conveyor comprising:
a plurality of yokes each formed of an integral body made of moldable material and each including at least one runner support surface;
at least one of said yokes including first and second spaced apart upright portions with upper and lower cross portions extending between and integral with said upright portions, each of said upper and lower cross portions including at least one respective stanchion located on said cross portion, each stanchion providing a respective runner support surface;
said at least one yoke including at least one side rail support surface;
said at least one yoke being an integral unit, wherein said stanchions are integral with said at least one yoke;
wherein a substantial portion of an upper face of said cross portion has a curved, convex surface;
at least one runner connected to said yokes at corresponding said runner support surfaces; and
frame members mechanically connected to said yokes.

22. The conveyor of claim 21 further comprising at least one side rail mechanically connected to said yokes, each said yoke including a side rail support surface.

* * * * *